A. R. WICKERSHAM.
GEAR PULLER.
APPLICATION FILED JUNE 2, 1919.
1,394,129.
Patented Oct. 18, 1921.
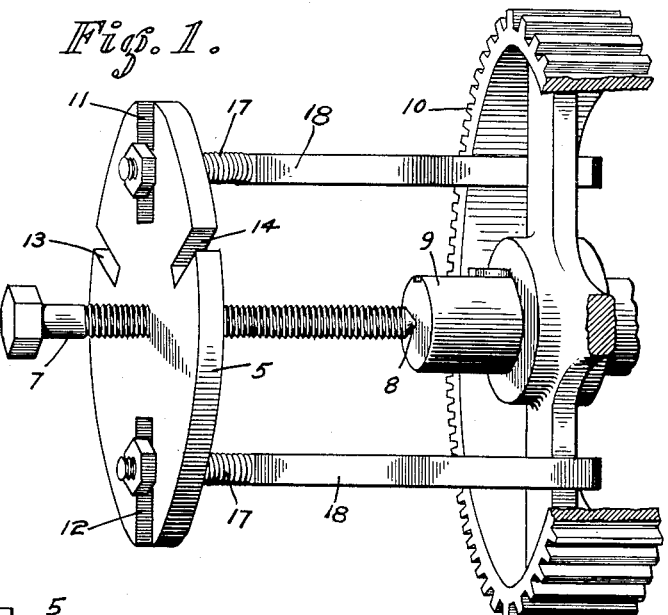
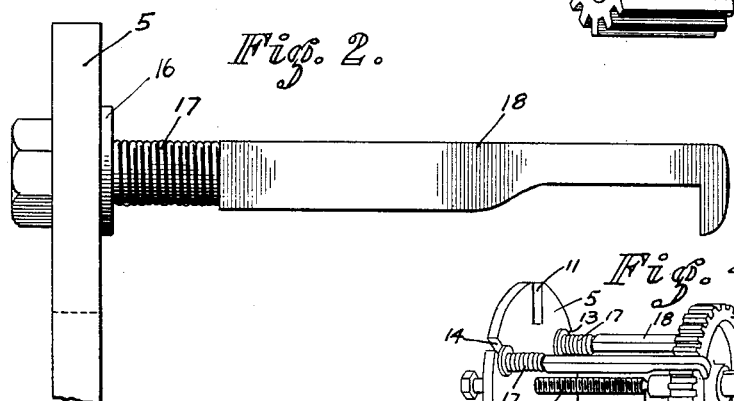
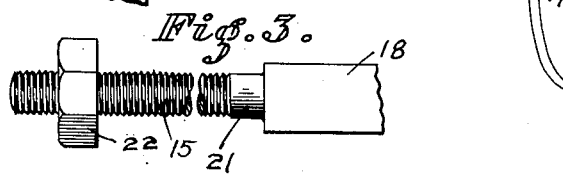
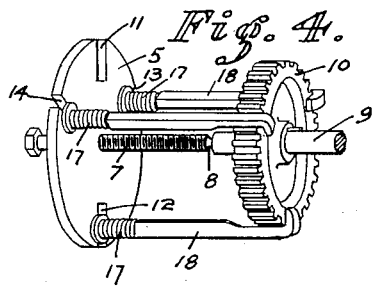
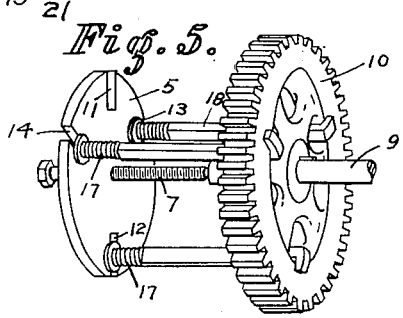
INVENTOR
ALFRED R. WICKERSHAM
BY
Baldwin Vale
ATTORNEY

UNITED STATES PATENT OFFICE.

ALFRED R. WICKERSHAM, OF OAKLAND, CALIFORNIA.

GEAR-PULLER.

1,394,129.  Specification of Letters Patent.  Patented Oct. 18, 1921.

Application filed June 2, 1919. Serial No. 301,564.

*To all whom it may concern:*

Be it known that I, ALFRED R. WICKERSHAM, a citizen of the United States, and a resident of the city of Oakland, county of Alameda, State of California, have made a new and useful invention—to wit, Improvements in Gear-Pullers; and I do hereby declare the following to be a full, clear, concise, and exact description of the same.

This invention relates to a new, novel and useful improvement in a gear puller, and is particularly adapted to the removal of gears from shafts where they have been keyed.

It is well known that after a gear is keyed upon a shaft, it is sometimes very difficult to remove the same owing to the fact that the key and keyway may become rusted, and consequently an even pressure must be brought to bear upon two or more sides of the gear, and at the same time pressure must be brought against the shaft to cause lateral movement thereof.

One object of my invention is to produce a device which will meet the requirements above mentioned.

Another object is to produce a device which will be applicable to gears, pulleys or the like, and one which may be readily attached and detached, also one which may be easily transported and economically manufactured.

In the accompanying drawings,—

Figure 1 is a perspective view of my device applied to the end of a shaft upon which a gear is mounted.

Fig. 2 is a plan view of one of the gear engaging hooks shown in operative position relative to a puller plate.

Fig. 3 is a detailed view of Fig. 2 with the tensioning spring and washer omitted therefrom.

Figs. 4 and 5 are perspective views illustrating the application of my invention.

The numeral 5 designates a circular puller plate having a centrally threaded opening therethrough, and the numeral 7 a bolt having a tapered point adapted to pass through the threaded opening and have threaded engagement therewith.

The tapered point 8 contacts with the end of a shaft 9 upon which a gear 10 is keyed. As shown at 11 and 12, in the puller plate 5, I have formed a plurality of diametrically opposite slots or slideways 11 and 12, and at 13 and 14 I provide slideways which are at an angle to the slideways 11 and 12.

Clamping members 18 having reduced and threaded portions 15 thereon, leaving a shoulder by the difference in diameter between the said threaded portion 15 and the main body 18, are adapted to pass through the slideways 11 and 12. Over the threaded shank 15 of these members 18, I slip a washer 16 and spring 17 that is adapted to rest against the shoulder formed on the end of the member 18. The members 18 are preferably constructed so that the bolt section 15 thereof may be formed integrally therewith by cutting the same down to the proper diameter and threading it. This construction as shown in Fig. 3 is mechanically preferable and by threading the end 15 of the reduced portion 21, the same can be passed into registry with the slideways 11 and 12 after a spring 17 and washer 16 has been interposed between the member 15 and inside face of the plate 5 and a threaded nut 22 placed into engagement with the outer end of said member 15 and the outer face of the plate 5. By regulating the position of the nut on the threaded end in relation to its contact with the plate 5, the position of the hooking members may be thus adjusted.

By this construction, I provide hooks which may be turned to any angle and may be adjusted to or from the shaft as requirements demand.

In operation, the screw threaded member 7 is withdrawn from plate 5 for a sufficient distance, so that when the point 8 abuts the end of the shaft 9, the points of the hook members will lie within the plane of the part of the gear to which they are to be attached. This may be the hub spokes or periphery of the gear, and if a small gear and having an even number of spokes, only two hook members would be necessary and the same will be used in slideways 11 and 12.

If, however, the gear has an uneven number of spokes, three hooks may be used occupying the slideways 11, 13 and 14. After these hooks have been adjusted, the member 7 is screwed inwardly which will cause outward movement of the plate 5, which in turn will draw the gear longitudinally upon the shaft 8 and cause its removal.

Having thus described my invention, what I claim as new and desire to secure by Letters Patent of the United States is:—

1. In a gear pulling device of the character described the combination of a plate;

a plurality of radially disposed slots in said plate; hooks slidably retained in said slots and yieldingly connected to said plate, adapted to engage a gear keyed to a shaft; means for adjusting the yielding connection between plate and hooks; a threaded opening centrally located in said plate; a threaded member engaging said threaded opening; and means for rotating said threaded member against said gear shaft.

2. In a gear pulling device of the character described, the combination of a plate; a plurality of radially disposed slots in said plate; threaded studs having shoulders thereon slidably mounted in said slots and provided with hook extensions adapted to engage a gear on a shaft, springs on said studs interposed between said shoulders and the plate; nuts engaging the threaded ends of said studs and bearing against the plate for adjusting the tension of said springs; a centrally threaded opening in said plate; a threaded member engaging said threaded opening; and means for rotating said threaded member against said gear shaft to move said plate relative thereto.

3. A device of the character described comprising a plate having a plurality of radially disposed slots around the periphery thereof; hooked studs slidably mounted in said slots; shoulders formed on said studs contiguous to said plate; expansion springs adapted to be positioned between said shoulders and plate; means adjustably mounted on said studs for regulating the tension of said springs and a threaded member adjustably positioned in said plate and movable relative thereto.

4. A device of the character described comprising a plate having a plurality of radially disposed slots around the periphery thereof; rods slidably mounted in said slots having the free ends thereof adapted to engage a wheel, said rods having the retained ends thereof provided with shoulders contiguous to said plate; expansion springs adapted to be positioned between said shoulders and plate; nuts engaging the threaded ends of said rods and bearing against the plate for adjusting the tension of said springs and a threaded member adjustably mounted in said plate adapted to engage a wheel axle for moving said plate and rods relative thereto.

5. A device of the character described comprising a plate having a plurality of radially disposed, open ended slots around the periphery thereof; rods slidably mounted in said slots and detachably engaging said plates having the free ends thereof adapted to engage a wheel, said rods having the retained ends thereof provided with shoulders contiguous to said plate; expansion springs adapted to be positioned between said shoulders and plate; nuts engaging the threaded ends of said rods and bearing against the plate for adjusting the tension of said springs and a threaded member adjustably mounted in said plate adapted to engage a wheel axle for moving said plate and rods relative thereto.

6. An appliance for separating a movable from a non-movable element comprising a member provided with elongated openings therein and having a threaded member adjustably positioned therein and movable relative thereto and adapted to engage said non-movable element; arms mounted in said openings and having the free ends thereof adapted to engage said movable element and spring means interposed between said arms and member for normally positioning said arms substantially parallel with said threaded member.

7. A device of the character described comprising a member having a plurality of slots therein; hooked studs slidably mounted in said slots; shoulders formed on said studs contiguous to said member; expansion springs adapted to be positioned between said shoulders and said member; means adjustably mounted on said studs for regulating the tension of said springs and a threaded member adjustably positioned in said first mentioned member and movable relative thereto.

8. A device of the character described, comprising a member having a plurality of slots therein; rods slidably mounted in said slots having the free ends thereof adapted to engage a movable article; said rods having the retained ends thereof provided with shoulders contiguous to said member; expansion springs adapted to be positioned between said shoulders and said member; nuts engaging the threaded ends of said rods and bearing against the said member for adjusting the tension of said springs and a threaded member adjustably mounted in said first mentioned member adapted to engage a stationary element for moving said member and rods relative thereto.

9. A device of the character described comprising a body member having a plurality of slots therein, hooked members arranged in said slots; spring means interposed between said hooked members and said slotted body member and a threaded member adjustably positioned in said body member and removable relative thereto.

10. A device of the character described comprising a body member having a plurality of slots therein; hooked members arranged in said slots; spring means for holding said hooked members at substantially right angles to said body member and a threaded member adjustably positioned in said body member and movable relative thereto.

11. An appliance for separating one element from another comprising a member provided with elongated openings therein and having a threaded member adjustably positioned therein and movable relative thereto and adapted to engage one of said elements; arms mounted in said openings and having the free ends thereof adapted to engage said other element and spring means for holding said hooked members at substantially right angles to said first mentioned member.

In testimony whereof, I have hereunto set my hand at San Francisco, Cal., this 10th day of April 1919.

ALFRED R. WICKERSHAM.

In presence of—

A. J. HENRY.